Nov. 21, 1967 — E. A. GLOS II — 3,353,675
DRUM FILTER ELEMENT ATTACHING MEANS
Filed Oct. 21, 1965 — 2 Sheets-Sheet 1
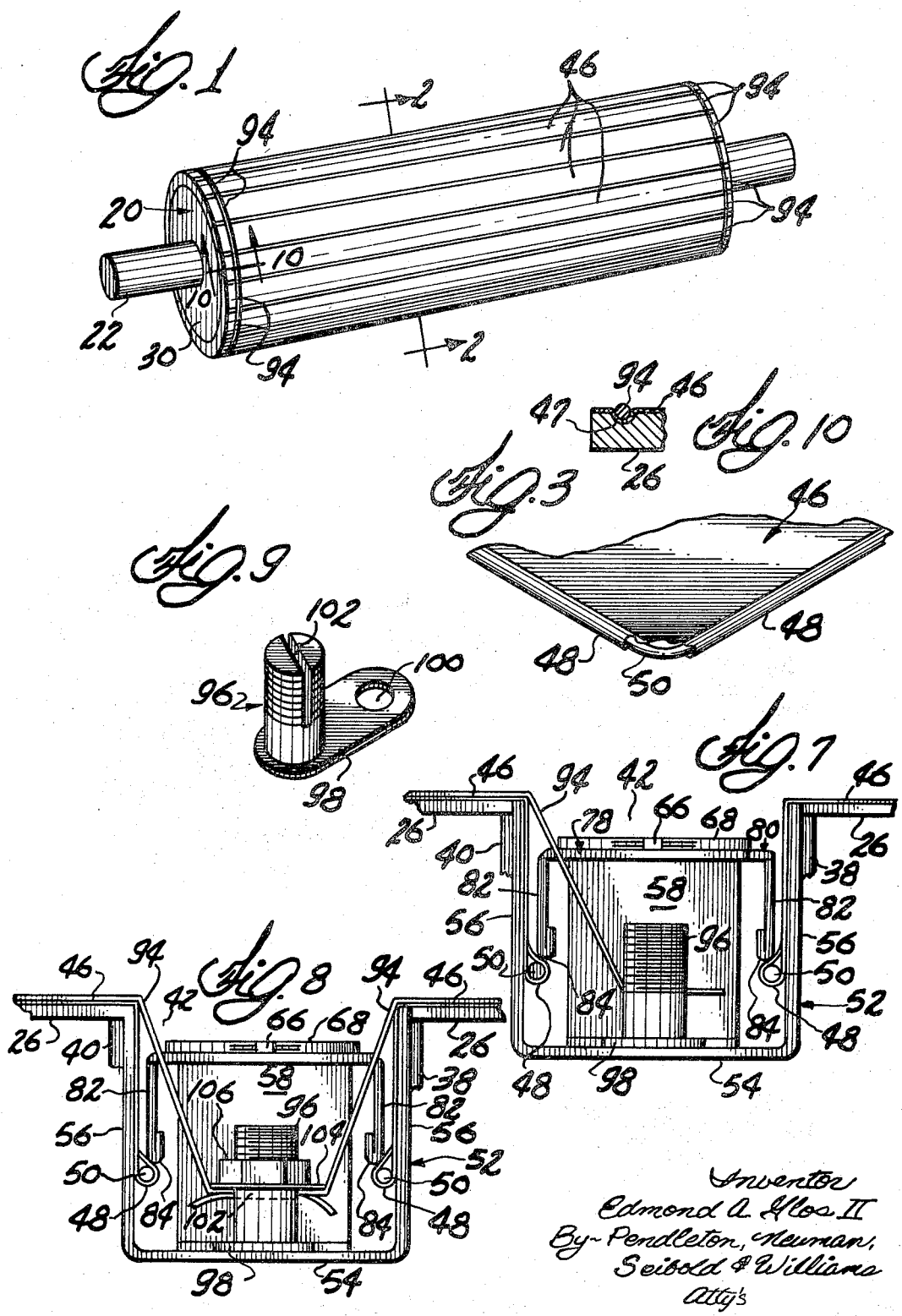

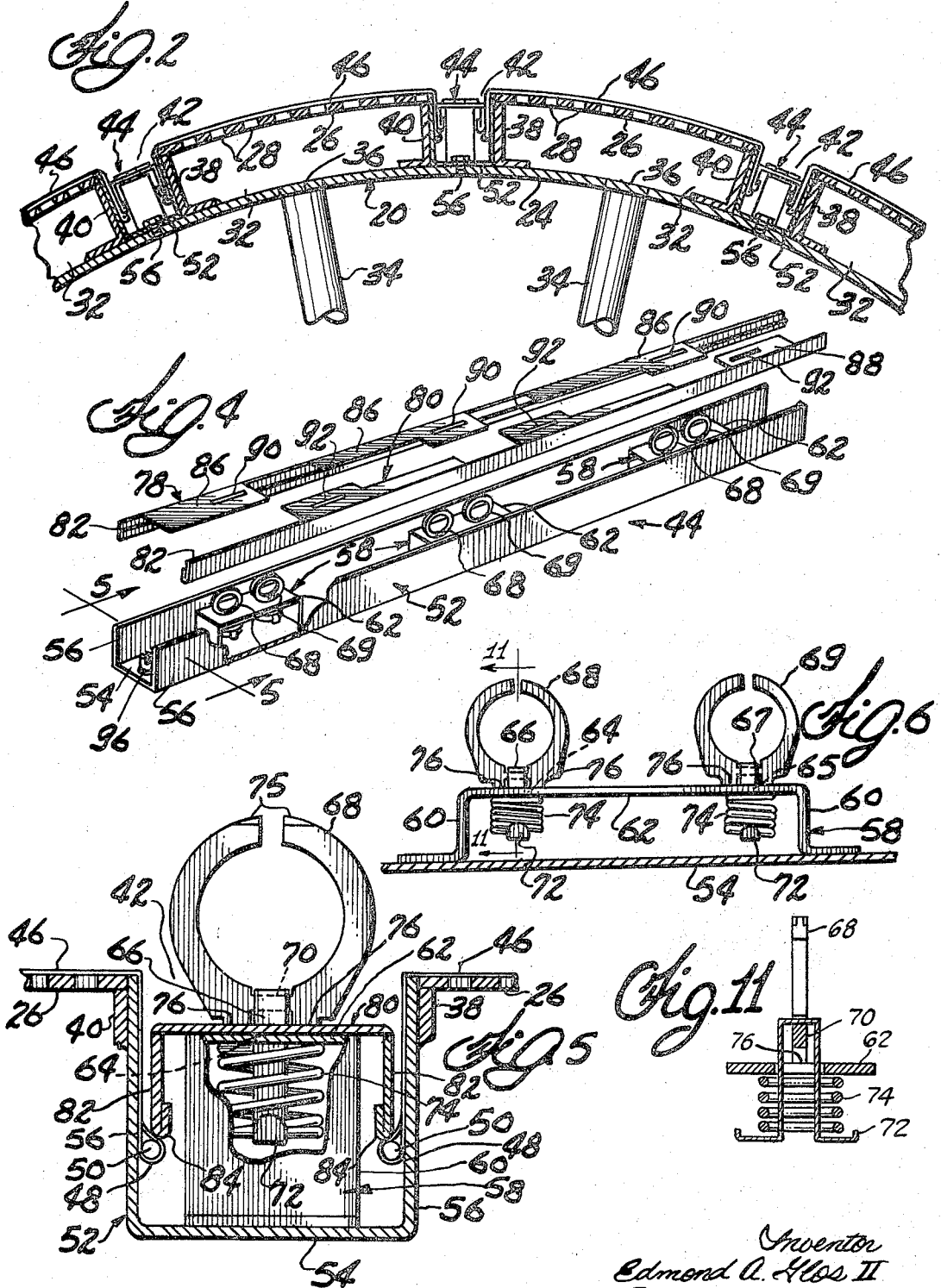

United States Patent Office 3,353,675
Patented Nov. 21, 1967

3,353,675
DRUM FILTER ELEMENT ATTACHING MEANS
Edmond A. Glos II, Deerfield, Ill., assignor to Mero & Company, Inc., Chicago, Ill., a corporation of Illinois
Filed Oct. 21, 1965, Ser. No. 499,498
10 Claims. (Cl. 210—238)

ABSTRACT OF THE DISCLOSURE

Means for attaching beaded edged filter cloths to a filter drum comprising an elongated channel member in the drum surface, and a pair of angle members separately attachable by spring biased members to stirrups centrally disposed in the channel. A first flange of each angle member extends radially of the drum to hold the beaded edge of the filter cloth against the side of the channel, and the second flange of each angle member extends perpendicularly to the first flange and includes slots for receiving the spring biased members.

---

This invention relates to drum filters or the like and, more particularly, to apparatus for attaching the filter cloth or other filtering material to the drum.

It has long been one form of practice in large filtering apparatus, such as, for example, in the mining industry, to attach rectangular panels of filter cloth to each other and to the filtering drum. The rectangular panels of filter cloth, after attachment to each other by sewing or stitching, were applied to the surface of the drum by disposing the same in a longitudinally extending groove or opening in the cylindrical surface of the drum and tightly tamping a rope or other form of calking into the groove exteriorly of the filter cloth. According to a modified form of practice heretofore, the longitudinal grooves in the drum's surface have been provided with restrictive openings, and after the seam portion of the filtering material was disposed in a groove, an elongated rod having a diameter greater than the restrictive groove opening was inserted into the groove through one end thereof, to secure the filtering material in the groove.

After the filtering material was attached to the drum as indicated, the drum was slowly rotated with a portion of its periphery disposed in the solution to be filtered. By appropriate means, vacuum was applied to that portion of the panel surface of the filtering drum whose filtering panels were immersed in the solution so as to cause particles in the solution to adhere to the surface of the filtering material. With continued rotation, those panels upon which filtered material or residue had deposited to form a cake moved out into the atmosphere and were slowly dried. Upon still further rotation of the drum, the filter cake on the filtering material was scraped off, or caused to flake off by the application of reverse pressure, or both. Still further rotation of the drum caused the filter to be again immersed in the solution and the process to be repeated.

The aforementioned cycle was continued until the filter cloth deteriorated, whereupon a particular panel or panels were removed and new ones substituted. Heretofore, the replacement of each worn out filter cloth panel required removal of the calking material from at least two grooves, cutting off the old cloth panel, stitching in a new cloth panel, and recalking. This panel replacement operation was time-consuming, inefficient and expensive, and it is an object of this invention to provide improved apparatus for attaching filter cloths to a filter drum or the like, whereby the panels of filter cloth may be readily attached to the filter drum.

It is a further object of this invention to provide apparatus for attaching filter cloth panels to a filter drum without the necessity of stitching the panels to each other to form longitudinal seams between adjacent panels.

It is a still further object of this invention to provide apparatus for attaching filter cloth panels to a filter drum which permits the removal and replacement of a worn out panel without having to remove from the drum adjacent panels which are still usable.

It is a still further object of this invention to provide apparatus whereby filter drums which are used in current practice may be modified so as to permit a simpler and more efficient attachment thereto of filtering material, according to the invention.

A still further object of this invention is to provide all of the foregoing objects while maintaining a relatively simple and economical filter construction.

These and other objects and advantages will be manifest from an examination of the specification, claims and drawings.

In accordance with one embodiment of the invention, there is provided apparatus for attaching elongate segments of web filtering material having peripherally beaded marginal edge portions to a filter drum having an elongate receiving opening in the surface thereof, said apparatus comprising an elongate channel receivable and securable within said opening and within which said marginal edge portions of an adjacent pair of said segments are to be received, a pair of elongate members receivable within said channel and each separately attachable to said channel, each of said elongate members including a radially disposed flange and a second flange perpendicular thereto, the radial flange of one of said pair of elongate members being engageable with said marginal edge portion of one member of said pair of segments and the radial flange of the other of said pair of elongate members being engageable with said marginal edge portion of the other member of said pair of segments whereby said respective marginal edge portions are independently securable within and removable from said channel, and means on said channel for independently securing said perpendicular flanges to said channel.

For a more complete understanding of the invention reference should be made to the accompanying drawings in which, FIG. 1 is a perspective view of filtering apparatus embodying the invention;

FIG. 2 is a fragmentary sectional view on a larger scale taken along the line 2—2 of FIG. 1;

FIG. 3 is a fragmentary perspective view of a peripherally beaded web filtering material employed in conjunction with the apparatus of the invention;

FIG. 4 is an enlarged exploded perspective view illustrating the relationship of certain components of the invention;

FIG. 5 is a fragmentary sectional view on an enlarged scale, showing certain components of the invention in operative relation;

FIG. 6 is an enlarged fragmentary sectional view showing certain components of the invention in position for assembly or disassembly of the apparatus of the invention;

FIG. 7 is a fragmentary view on an enlarged scale showing certain other components of the invention;

FIG. 8 is a fragmentary view on an enlarged scale showing still other components of the invention;

FIG. 9 is a perspective view of one of the components of the invention shown in FIGS. 7 and 8;

FIG. 10 is a partial sectional view on an enlarged scale taken along the line 10—10 of FIG. 1; and FIG. 11 is a sectional view taken in the direction of arrows 11—11 of FIG. 6.

Referring now to the drawings, particularly FIGS. 1 and 2 thereof, there is provided a cylindrical drum 20 mounted for rotation on a horizontal shaft 22 and having an inner cylindrical surface 24 and a plurality of outer cylindrical surface segments 26, the latter having a plurality of perforations 28 therethrough. Each end of the drum 20 is sealed off by a pair of circular end plates 30 whereby a plurality of longitudinally-extending, peripheral chambers 32 are formed between the surfaces 24 and 26 of the drum. The axially extending sides of each chamber 32 comprise angle members 38 and 40 which extend between the ends of the drum and may be secured to the inner and outer surfaces 24 and 26 of the drum by welding, for example. Each chamber 32 is provided with one or more conduits 34 extending from openings 36 in the inner drum surface 24 by means of which a vacuum or back pressure, as desired, may be applied to chambers 32.

As shown in FIG. 2 adjacent angle members 38 and 40 are spaced apart to provide a plurality of elongate openings 42 in the drum surface between adjacent pairs of chambers 32. Each elongate opening 42 is adapted to receive therein a web attaching assembly 44 (FIG. 4) whereby elongate segments 46 of web filtering material may be independently secured to the drum over each perforated surface 26. As shown in FIG. 3, each elongate segment 46 of the filtering material, which may be made of cloth, canvas or other suitable material, has peripherally-beaded, marginal edge portions 48 which may be formed by stitching the edges of the filtering material back upon themselves around a bead 50 which may be made of nylon rope, or other suitable, similarly flexible material.

Each attaching assembly 44 comprises an elongate channel 52 having a web portion 54 and a pair of radially outwardly-extending flanges 56. Each channel 52 is coextensive in length with a drum opening 42 and is adapted to be snugly received therein. The channels 52 may be secured to the inner surface 24 of the drum 20 by means of a plurality of screws 96 spaced along the web portion 54.

As best seen in FIGS. 4 and 5, each channel 52 has attached thereto as by welding a plurality of stirrups 58 which extend radially outwardly from the web portion 54 of the channel and between the flanges 56 thereof. Each stirrup 58 includes a pair of radially-extending side members 60 and interconnecting axial portions 62, the latter having a pair of axially-aligned apertures 64 and 65 therethrough (FIG. 6).

Apertures 64 and 65 are adapted to receive therethrough bifurcated latch members 66 and 67 having pivotally-attached handles 68 and 69, respectively. Each handle includes a centrally-disposed pin portion 70 which engages and supports the center of the bifurcated latch member and from which the opposed legs of the latch member depend. As shown in FIGS. 5, 6 and 11, the two legs of each bifurcated member 66 have a turned up lip 72 at the bottom thereof for supporting the radially inward end of a spring 74 which is disposed between the lips 72 and the inner surface of the axial portion 62 of the stirrup 58. The latch members 66 and 67, by means of their respective handles 68 and 69, may be rotated within the apertures 64 and 65 and when the latch members and attached handles are rotated to the position shown in FIG. 6, the springs 74 cause the lower ends 76 of each handle to bear against the upper surface of the axial portions 62 of the stirrups 58. When the latch members 66 and 67 and attached handles 68 and 69, respectively, are positioned as shown in FIG. 6, they are in position for attaching other parts of the web attaching assembly 44 as will now be described.

With particular reference to FIG. 4, the web attaching assembly 44 also includes a pair of opposed, elongated, angle-like members 78 and 80 which are also coextensive with the channel 54 and adapted to be received therein. Each angle-like member 78 and 80 includes a radially-disposed flange 82, the lower portion of which may be bent back upon itself (FIG. 5) to provide rigidity as well as a smooth, rounded lower edge 84. The members 78 and 80 also include a plurality of spaced apart flanges 86 and 88, respectively, the flanges 86 and 88 being coplanar, and the flanges of one of the facing angle-like members 78 and 80 being receivable between the flanges of the other angle-like member in coplanar relationship. The flanges 86 and 88 are each provided with elongate axial slots 90 and 92 therethrough, respectively, the slots 90 and 92 being alignable, respectively, with the latch members 66 and 67 and the length and width of the slots being sufficient to receive therethrough the handles 68 and 69 of the respective latch members.

In attaching a segment 46 of the web filtering material to the drum 20, the segment 46 is first aligned and centered over a perforated section 26 of the drum cylinder, the opposed axial marginal edge portions 48 of the segment 46 being allowed to fall into a pair of adjacent channels 52. An elongated member 78 is then inserted into one of the channels 52 with the slots 90 thereof in alignment with latch members 66 and handles 68 which pass through the slots 90, the member 78 finally coming to rest on the stirrups 58. By means of the handles 68, the latch members 66 are then pulled radially outwardly against the bias of the springs 74 a distance greater than the thickness of the flanges 86. The handles 68 are then rotated to a position approximately at right angles to their starting position so that when the handles 68 are released the lower ends 76 thereof are biased by means of the springs 74 against the flanges 86 of the angle-like member 78. In this position of the member 78, the inner edge 84 of the flange 82 thereof engages the beaded marginal edge 48 of the web material 46 to firmly secure the marginal edge 48 within the channel 52.

After one marginal edge portion of one filter segment 46 is thus secured within a channel 52, the opposed axial marginal edge thereof is similarly secured within an adjacent channel 52 by inserting an angle-like member 80 in an adjacent channel with the slots 92 thereof in alignment with latch members 67 and handles 69 which pass through the slots 92, the member 80 finally coming to rest on the stirrups 58. The handles 69 are then similarly raised, rotated and released to firmly secure the opposed axial marginal edge 48 of the web material segment 46 within the adjacent channel 52 and draw the web segment 46 tightly against the underlying perforated drum surface 26.

After the opposed marginal edges 48 of each web material segment 46 are thus secured within an adjacent pair of channels 52, the handles 68 and 69 may be pivoted inwardly from the position shown in FIG. 5 to the position shown in FIG. 8 so that the handles do not extend beyond the periphery of the drum surface during the filtering operation. In this pivotal movement of the handles, the pin portions 70 thereof function as hinge pins between the legs of the bifurcated latch members 66 and 67 as may be seen best in FIG. 11. As shown in FIG. 5, the handles 68 and 69 may be provided with tapered or recessed end portions 75 whereby a tool such as a screwdriver may be inserted to raise the handles when removing the filter segments 46.

After the opposed, axially-extending, marginal edge portions 48 of the web segments 46 are secured in the respective adjacent channels 52 as hereinbefore described, the circumferential ends of each web segment 46 are further secured to the outer surface 26 of the drum 20 by means of a plurality of wires 94 which hold the circumferential ends of each web section in grooves 47 near the ends of each drum surface 26, as best seen in FIGS. 1, 7, 8 and 10. As shown in FIGS. 4 and 9, a pair of threaded studs 96 having integral mounting plates 98 are secured to the channels 52 near each end of the web portions 54 thereof either by welding or by a screw receivable through the opening 100 in the plate 98. Each stud 96 has a radially disposed slot 102 in the threaded portion thereof, the slot 102 extending perpendicularly to the flanges 56 of the channel 52. One end of each wire 94 is inserted in the slot 102 of one stud 96, and the wire 94 extends over one end of web segment 46 and has its other end inserted into a similar slot 102 of another stud 96 in the next adjacent channel. After the ends of a pair of wires 94 engaging the ends of a pair of adjacent web segments 46 are received in each slot 102 (FIG. 8), a washer 104 and nut 106 are secured on the threaded portion of the stud 96 to retain the ends of the wires 94 within the slot 102 to firmly hold the circumferential ends of each web segment 46 against the surface of the filter drum.

Although as hereinbefore described it may be more convenient to first secure both opposed, axial marginal edges 48 of a single web segment 46 in adjacent channels 52, it should be understood that, if desired, the marginal edges of a pair of adjacent web segments 46 may be independently secured in a single channel 52 in the manner described prior to securing the opposed axial marginal edge of either of the adjacent web segments in an adjacent channel. It is also readily apparent that when it is necessary to replace a worn-out filter segment or segments 46, the same may be readily removed from the drum by virtually reversing the manner of attachment thereto hereinbefore described.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Apparatus for attaching elongate segments of web filtering material having peripherally beaded marginal edge portions to a filter drum having an elongate receiving opening in the surface thereof, said apparatus comprising an elongate channel receivable and securable within said opening and within which said beaded marginal edge portions of an adjacent pair of said segments are to be received, and a pair of elongated members receivable within said channel and each separately attachable to said channel, each of said elongate members including a radially disposed flange and a second flange perpendicular thereto, the radial flange of one of said pair of elongate members being engageable with said beaded marginal edge portion of one member of said pair of segments and the radial flange of the other of said pair of elongate members being engageable with said beaded marginal edge portion of the other member of said pair of segments whereby said respective beaded marginal edge portions are independently securable within and removable from said channel.

2. Apparatus for attaching elongate segments of web filtering material having peripherally beaded marginal edge portions to a filter drum having an elongate receiving opening in the surface thereof, said apparatus comprising an elongate channel receivable and securable within said opening and within which said beaded marginal edge portions of an adjacent pair of said segments are to be received, a pair of elongate members receivable within said channel and each separately attachable to said channel, each of sid elongate members including a radially disposed flange and a second flange perpendicular thereto, the radial flange of one of said pair of elongate members being engageable with said beaded marginal edge portion of one member of said pair of segments and the radial flange of the other of said pair of elongate members being engageable with said beaded marginal edge portion of the other member of said pair of segments whereby said respective beaded marginal edge portions are independently securable within and removable from said channel, and means on said channel for independently securing said perpendicular flanges to said channel.

3. Apparatus according to claim 2 wherein said securing means comprise spring biased members for biasing said radial flanges and said beaded marginal edge portions radially inwardly within said channel.

4. Apparatus for attaching elongate segments of web filtering material having peripherally beaded marginal edge portions to a filter drum having an elongate receiving opening in the surface thereof, said apparatus comprising an elongate channel receivable and securable within said opening and within which said beaded marginal edge portions of an adjacent pair of said segments are to be received, a pair of elongate members receivable within said channel and each separately attachable to said channel, each of said elongate members including a radially disposed flange and a plurality of spaced-apart coplanar flanges perpendicular thereto, the radial flange of one of said pair of elongate members being engageable with said beaded marginal edge portion of one member of said pair of segments and the radial flange of the other of said pair of elongate members being engageable with said beaded marginal edge portion of the other member of said pair of segments whereby said respective marginal edge portions are independently securable within and removable from said channel, and means on said channel for independently securing said spaced-apart flanges to said channel.

5. Apparatus according to claim 4 wherein said securing means comprise a plurality of spring biased members for biasing said radial flanges and said beaded marginal edge portions radially inwardly within said channel.

6. Apparatus for attaching elongate segments of web filtering material having peripherally beaded marginal edge portions to a filter drum having an elongate receiving opening in the surface thereof, said apparatus comprising an elongate channel receivable and securable within said opening and within which said beaded marginal edge portions of an adjacent pair of said segments are to be received, a pair of elongate members receivable within said channel and each separately attachable to said channel, each of said elongate members including a radially disposed flange and a plurality of spaced-apart coplanar flanges perpendicular thereto, the spaced-apart flanges of each of said elongate members being disposable between the spaced-apart flanges of the other of said elongate members, the radial flange of one of said pair of elongate members being engageable with the beaded marginal edge portion of one member of said pair of segments and the radial flange of the other of said pair of elongate members being engageable with the beaded marginal edge portion of the other member of said pair of segments whereby said respective marginal edge portions are independently securable within and removable from said channel, and means on said channel for independently securing said spaced-apart flanges to said channel.

7. Apparatus according to claim 6 wherein said securing means comprise two sets of spring biased members for biasing said radial flanges and said beaded marginal edge portions radially inwardly within said channel, one of said sets being engageable with the perpendicular flanges of one of said elongate members and the other of said sets being engageable with the perpendicular flanges of the other of said elongate members.

8. Apparatus for attaching elongate segments of web filtering material having peripherally beaded marginal edge portions to a filter drum having an elongate receiving opening in the surface thereof, said apparatus comprising an elongate, radially-outwardly facing channel receivable and securable within said opening and within which said beaded marginal edge portions of an adjacent pair of said segments are to be received, a pair of elongate, facing angle-like members receivable within said channel and each separately attachable to said channel, each of said elongate members including a radially disposed flange spaced respectively from the proximate flange of said channel a distance greater than the thickness of said web material but less than the thickness of the beaded marginal edge portion thereof, each of said elongate members also including a plurality of spaced-apart coplanar flanges perpendicular respectively to said radially disposed flanges at the radially outward ends thereof, the spaced-apart flanges of each of said elongate members being disposable alternately and in coplanar relationship between the spaced-apart flanges of the other of said elongate members, the radially inward edge of the radial flange of one of said pair of elongate members being engageable with the beaded marginal edge portion of one member of said pair of segments and the radially inward edge of the radial flange of the other of said pair of elongate members being engageable with the beaded marginal edge portion of the other member of said pair of segments whereby said respective beaded marginal edge portions are independently securable within and removable from said channel, and means on said channel for independently securing said spaced-apart flanges to said channel.

9. Apparatus according to claim 8 wherein said securing means comprise two sets of spring biased members for biasing said radial flanges and said beaded marginal edge portions radially inwardly within said channel, one of said sets being engageable with the perpendicular flanges of one of said elongate members and the other of said sets being engageable with the perpendicular flanges of the other of said elongate members.

10. Apparatus for attaching elongate segments of web filtering material having peripherally beaded marginal edge portions to a filter drum having an elongate receiving opening in the surface thereof, said apparatus comprising an elongate, radially-outwardly facing channel receivable and securable within said opening and within which said beaded marginal edge portions of an adjacent pair of said segments are to be received, a pair of elongate, facing angle-like members receivable within said channel and each separately attachable to said channel, each of said elongate members including a radially disposed flange spaced respectively from the proximate flange of said channel a distance greater than the thickness of said web material but less than the thickness of the beaded marginal edge portion thereof, each of said elongate members also including a plurality of spaced-apart coplanar flanges perpendicular respectively to said radially disposed flanges at the radially outward ends thereof, the spaced-apart flanges of each of said elongate members being disposable alternately and in coplanar relationship between the spaced-apart flanges of the other of said elongate members, each of said spaced-apart flanges having an elongated slot therethrough, the radially inward edge of the radial flange of one of said pair of elongate members being engageable with the beaded marginal edge portion of one member of said pair of segments and the radially inward edge of the radial flange of the other of said pair of elongate members being engageable with the beaded marginal edge portion of the other member of said pair of segments whereby said respective beaded marginal edge portions are independently securable within and removable from said channel, and means on said channel for independently securing said spaced-apart flanges to said channel, said securing means comprising a plurality of stirrups extending upwardly from the web of said channel and between said radially disposed flanges, a pair of spaced-apart apertures in the top of each of said stirrups, one of each said pair of apertures being alignable with a slot in the spaced-apart flanges of one elongated angle-like member and the other of each said pair of apertures being alignable with a slot in the spaced-apart flanges of the other elongated angle-like member, a first set of spring-biased latch members, each latch member of said first set being receivable through an aligned aperture and slot in one of said elongated angle-like members to bias said beaded marginal edge portion of one member of said pair of segments radially inwardly within said channel, and a second set of spring-biased latch members, each latch member of said second set being receivable through an aligned aperture and slot in the other of said elongated angle-like members to bias said beaded marginal edge portion of the other member of said pair of segments radially inwardly within said channel.

References Cited

UNITED STATES PATENTS

| | | | |
|---|---|---|---|
| 2,055,251 | 9/1936 | Duvall | 210—404 |
| 2,259,235 | 10/1941 | Weiss | 210—404 |
| 3,288,296 | 11/1966 | Hirs | 210—232 |

FOREIGN PATENTS

| | | |
|---|---|---|
| 629,200 | 10/1961 | Canada. |
| 329,058 | 11/1920 | Germany. |
| 416,485 | 7/1925 | Germany. |
| 667,857 | 3/1952 | Great Britain. |

REUBEN FRIEDMAN, *Primary Examiner.*

F. SPEAR, *Assistant Examiner.*